Oct. 13, 1925.
E. WEISS ET AL
1,557,508
ELECTRICALLY HEATED FUNNEL
Filed July 20, 1923
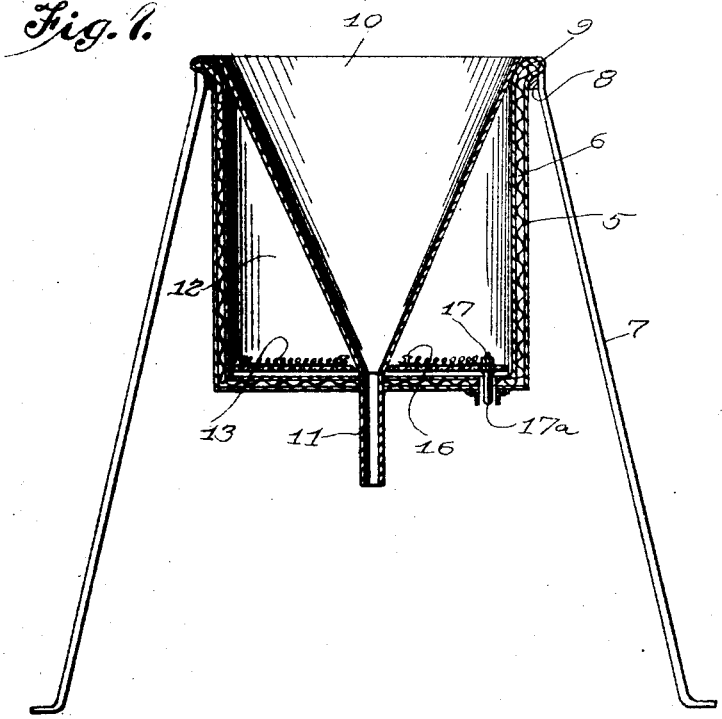
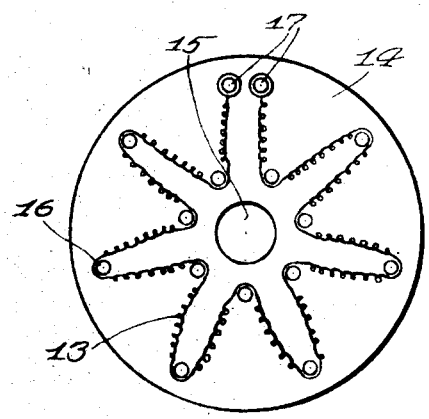
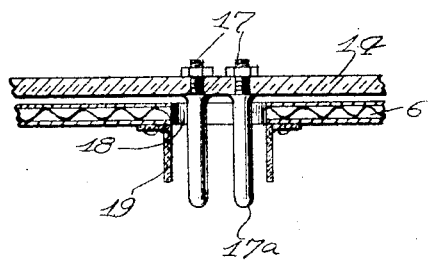
Inventors
Emil Weiss
Frank Hnilo
Milo B. Stevens Co.
Attorneys Patented Oct. 13, 1925.

1,557,508

UNITED STATES PATENT OFFICE.

EMIL WEISS AND FRANK HNILO, OF CHICAGO, ILLINOIS.

ELECTRICALLY-HEATED FUNNEL.

Application filed July 20, 1923. Serial No. 652,814.

*To all whom it may concern:*

Be it known that we, EMIL WEISS and FRANK HNILO, respectively, a subject of Yugoslavia and a citizen of the United States, residing at Chicago, in the county of Cook and State of Illinois, have invented new and useful Improvements in Electrically-Heated Funnels, of which the following is a specification.

Our invention relates to filtering devices for heavy liquids or semi-liquids and contemplates especially the provision of a novel and improved means for heating said substances during the filtering process to hasten the operation and render a more efficient result than would otherwise be obtained.

In filtering heavy solutions in laboratory and other processes considerable difficulty is experienced in securing the passage of the liquid through the cotton or other filtering substance which is usually disposed in the funnel into which the liquid is poured. Poking or prodding the cotton to prevent clogging of the liquid results in the formation of openings therethrough which permit the passage of the liquid without proper filtration. However, the application of heat to the funnel or in other ways to the liquid within the funnel serves to thin the same to permit the proper filtration thereof through the cotton. In heating the funnel from the exterior thereof care must be taken not to heat the funnel wall to such an extent that the cotton or liquid will become ignited. It is, therefore, the primary object of our invention to provide a novel and improved arrangement whereby a heating medium for the funnel is furnished which will efficiently heat the same without the attendant danger of igniting the contents thereof.

A further object of the invention is the provision of an improved container or support for the funnel to which a removable heating unit is attached.

The invention has for a further object to furnish in a device of this character a novel and improved heating unit whereby a continuous and uniform supply of heat will be provided to the funnel and contents.

And further, the invention aims to create a device of this kind which will be very simple in construction, easily assembled and dissembled, and which may be inexpensively manufactured.

With the above principal objects in view, and other incidental objects which will become apparent during the course of the detailed description appearing hereinafter, the invention comprises certain novel features of construction and arrangement of the various parts, a better understanding of which will be had upon reference to the accompanying drawing forming a part of this specification wherein a preferred embodiment of the invention is illustrated.

In the drawing,

Figure 1 is a vertical sectional view through a filtering apparatus constructed in accordance with my invention;

Fig. 2 is a plan of the heating unit and the insulated plate therefor, and

Fig. 3 is an enlarged sectional detail in fragmentary form showing a pair of electrodes for connection to an energizing circuit.

Referring now specifically to the drawing, wherein like reference characters have been used throughout to designate similar parts, numeral 5 denotes a double wall container of preferably cylindrical form, the space between the two walls being filled with asbestos paper or other suitable insulating material as shown at 6. The container 5 is preferably formed of metal and is supported upon a stand embodying legs 7 which are suitably attached to an upper supporting ring 8 upon which the circumferential lip or rim of the container rests as shown at 9.

The funnel 10, shown in Fig. 1, is inserted into the container, the flared portion of the funnel resting upon the inner surface of the lip 9, while the neck 11 thereof extends through a central aperture in the bottom of the container 5. It might here be stated that a suitable hose or other valved conduit may be connected to the neck 11 for carrying off the filtered substance to a suitable container.

It will be readily apparent from the foregoing that the funnel upon being placed in the receptacle 5 as just described forms a closure for the receptacle since the flared upper portion of the funnel will be firmly and snugly seated against the inner portion of the lip 9 of the container, while the lower portion of the funnel adjacent the neck 11 thereof will serve as a plug for the opening in the bottom of the container. A closed air space 12 within the container is thus provided, and the air within this space heated by wire coils 13 acts as the heating medium for uniformly heating the entire surface of the funnel without, however, rendering liable the superheating thereof to such an extent as to ignite the cotton or liquid therein.

The heater embodies the coils 13 above referred to, same being formed from one length of wire and trained around pins 16, the arrangement of the coils defining a star-like outline upon the insulated annular plate 14 as shown in Fig. 2 whereby a greater number of coils may be used than would otherwise be possible, the purpose of using a plurality of coils being, of course, to more intensely heat the air space 12.

The insulated annular plate 14 may be merely rested upon the bottom of the container 5 as shown in the drawings or it may be screwed or otherwise attached thereto in an obvious manner to permit ready removal thereof. The wire forming the coils 13 is attached to two binding posts 17 as shown in Figs. 2 and 3, which latter extend through the plate 14 and out through an opening 18 in the bottom of the container 5, these extended portions of the binding posts terminating in electrodes 17ª which are receivable within the openings of the standard attaching plugs from an electric circuit. Since the plug is of standard design and forms no part of the present invention, it has not been illustrated. The opening 18 is surrounded by an annular flange 19 which serves to engage the outer wall of the plug to hold it in place when applied.

From the foregoing description read in connection with the accompanying drawing, the novel features of construction and arrangement of the various parts of our device will be readily appreciated by those skilled in the art. The insulated material between the two walls of the container 5 serves to prevent the escape of heat therefrom, while the metal inner wall of the container will radiate the heat against the funnel 10.

The simple construction of the device renders dissembling thereof for inspection or repair of the heating unit an easy matter and the same may be conveniently knocked down for packing or shipping.

While we have described and illustrated herein the preferred embodiment of our invention, it will, however, be distinctly understood that we do not propose to limit ourselves strictly to the embodiment disclosed, since various changes and modifications thereof will immediately disclose themselves to those skilled in the art without departing from the spirit of the invention, the scope of which is defined by the following claims.

Having thus described our invention, what we claim as new and desire to secure by Letters Patent is:

1. In combination, a cylindrical casing open at the top and having its side and bottom walls formed of heat insulating material, the bottom wall having a central aperture therein, a funnel having a neck extending through said aperture and its upper edge engaging the upper edge of the side wall of the casing, said funnel having its body of inverted frusto-conical shape whereby an air chamber is formed between the funnel and casing walls, and an electric heating unit in said chamber in spaced relation to the funnel whereby the air in the chamber may be heated and the funnel heated by said air without direct contact between the heating unit and funnel.

2. In a combination, a cylindrical casing open at the top and having its side and bottom walls formed of heat insulating material, the bottom wall having a central aperture therein, a funnel having a neck extending through said aperture and its upper edge engaging the upper edge of the side wall of the casing, said funnel having its body of inverted frusto-conical shape whereby an air chamber is formed between the funnel and casing walls, a disk of electric insulating material in said casing spaced slightly above the bottom wall thereof and having a central aperture through which the neck of said funnel passes, and an electric heating unit consisting of a resistance element resting flat on said disk in spaced relation to the center thereof.

In testimony whereof we affix our signatures.

DR. EMIL WEISS.
FRANK HNILO.